United States Patent Office.

GEORGE GUENTHER, OF CHICAGO, ILLINOIS, AND E. H. NEYMANN, OF NEW YORK, N. Y., ASSIGNEES OF GEORGE GUENTHER.

*Letters Patent No.* 97,771, *dated December* 14, 1869; *reissue No.* 3,884, *dated March* 22, 1870.

IMPROVEMENT IN THE MANUFACTURE OF GLUE.

The Schedule referred to in these Letters Patent and making part of the same.

*To all whom it may concern:*

Be it known that I, GEORGE GUENTHER, of Chicago, county of Cook and State of Illinois, have invented certain new and useful Improvements in Glue; and I do hereby declare that the following is a full and exact description of the same.

Glue is ordinarily boiled down to the consistence of a thin liquid, which in that condition is run into molds wherein it is allowed to cool, and then cut into slices, which are subsequently dried on nets.

This glue in its liquid state is far too thin for any use. The dried glue is packed and transported in the form of cakes or pieces of cakes, which, before they can be used by the consumer, must be soaked, boiled, and stirred for a long period.

Besides the loss of time and labor involved in these operations of first drying and then liquefying the glue again, the adhesive qualities of the same are always liable to be seriously injured by partial decay while on the drying-nets, depending entirely on the state of the atmosphere, while it is no less endangered by scorching, and from other causes, if dried by artificial heat.

My mode is the following:

I take freshly-made glue, of very good stock, which has been boiled in a vacuum until its consistency is as nearly as possible that which would be required for immediate use. This I fill into previously-heated cases, close the openings tightly, and transfer them through suitably arranged double doors or otherwise, in an inverted position, into a strong chamber, within which is maintained a temperature a little above 212° Fahrenheit, and a pressure a little below the ordinary atmospheric, which latter I can maintain by means of a moderate-sized air-pump.

By supplying in one part of the chamber a chemical agent that has a great affinity for water, I succeed in obtaining a very dry atmosphere within, and the pressure within each case forces out a small quantity of the contents, and this glue, by drying as soon as it appears on the exterior, forms a perfectly tight seal.

I find that bottles of strong glass in the ordinary rounded form, but with shorter necks, may be used with advantage, and, if provided with a screw-cap, the bottle requires only to be slightly heated in order to open the same and to discharge its contents, leaving it in condition to be immediately refilled afresh.

Tin cans, similar to those used in putting up fruits, may also be used to advantage, but, although any mode of sealing which effectually succeeds in excluding the atmospheric air from the liquid will answer my purpose, I do not deem it absolutely essential to use rubber, resin, or other sealing-agents, because the glue itself will form as perfect a mode of closing, in the process above described, as can be procured by any other means.

After a brief interval in the drying, or what I call the vacuum-chamber, the packages may be removed and slowly cooled. My glue may be kept for any period, in any climate, and under any conditions.

When it is desired for use, the vessel may be opened either by moistening the glue at the mouth, or, in some cases, by simply immersing the package in hot water. The fluid contents are then ready for immediate use, and may be diluted with water, according to necessity.

My invention is intended more particularly for manufacturers, who not only require the very best kind of glue, but who use considerable quantities of it. A package when once opened should be emptied entirely.

I believe that success may be attained in the manufacture of my packages by drying their mouths in the ordinary pressure of the atmosphere, but this requires a more delicate adjustment of heat, so as to get a temperature a little above the boiling-point of thick glue, and not enough above to damage the product.

I prefer the partial vacuum described. It is then very easy to obtain the desired effect with a very moderate heat, say, 215° Fahrenheit.

I claim, as a new article of manufacture, the within-described canned glue, preserving the glue in a gelatinous state and a condition fit for immediate use for any period, by the exclusion of atmospheric air, prepared substantially in the manner and so as to combine the advantages herein set forth.

In testimony whereof we have hereunto set our names in the presence of two subscribing witnesses.

GEO. GUENTHER.
E. H. NEYMANN.

Witnesses:
TH. HOLMAN,
JOHN DRESSLER,
W. C. DEY,
A. HOERMANN.